April 13, 1926.  1,580,359
C. T. ALLCUTT
RADIO RECEIVING SYSTEM
Filed Dec. 30, 1920
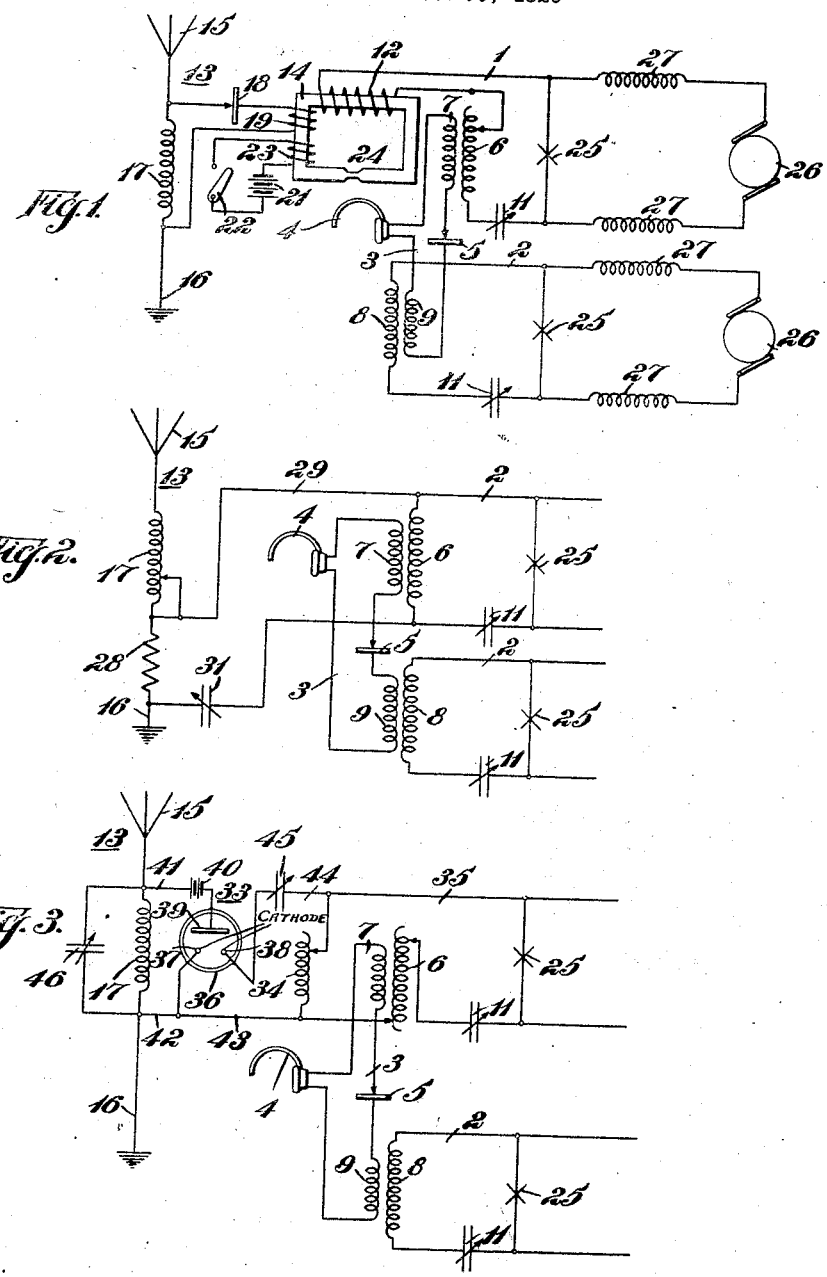
WITNESSES:
INVENTOR
Chester T. Allcutt
BY
Wesley G. Carr
ATTORNEY Patented Apr. 13, 1926.

1,580,359

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

RADIO RECEIVING SYSTEM.

Application filed December 30, 1920. Serial No. 434,021.

*To all whom it may concern:*

Be it known that I, CHESTER T. ALLCUTT, a citizen of the United States, and a resident of Pittsburgh, in the county of Allegheny and State of Pennsylvania, have invented a new and useful Improvement in Radio Receiving Systems, of which the folloiwng is a specification.

My invention relates to radio receiving systems and more especially to systems employing the "beat" principle of operation.

The object of my invention is to provide a receiving system of unusual sensitivity embodying the use of the well known heterodyne or "beat" principle of operation.

Heretofore, in systems employing the "beat" principle of operation, the beat currents have been formed by combining locally-generated high-frequency currents and the received impulses. This combination of the two currents has resulted in a receiving system that is of unusual sensitivity and, for certain wave lengths, highly selective.

According to my invention, I provide a receiving system of unusual sensitivity that embodies new means whereby the energy of a received impulse may cause the formation of beat currents in a local receiving circuit.

More specifically, I cause the received impulses to vary the relation between two local sources of high-frequency currents to cause the passage of variable currents in a local receiving circuit electrically connected to the two local sources.

Assuming that the periods of the two local high-frequency sources are initially the same, the effect of a received impulse is to cause beat currents to traverse the local receiving circuit.

Assuming a condition in which the frequencies of the high-frequency circuits are such that beat currents initially traverse the local receiving circuit, the effect of a received impulse may be such as to cause the beat currents to change in frequency or to disappear, periodically.

My invention may best be understood by reference to the accompanying drawings, in which:

Figure 1 is a diagrammatic view of circuits and apparatus embodying my invention.

Fig. 2 shows an alternative arrangement to that of Fig. 1 for varying the relation between the pair of high-frequency circuits.

Fig. 3 shows another arrangement for varying the relation between the pair of high-frequency circuits.

Like numerals are applied to like parts having a similar function.

Referring to Fig. 1, a pair of high-frequency circuits 1 and 2 are electrically connected to a local receiving circuit 3, which comprises a receiving device 4 and a rectifier 5, through coupling coils 6, 7, and 8, 9, respectively. The high-frequency circuit 1, which comprises a variable capacitance 11, the coil 6 and a magnetizing winding 12, is coupled to an antenna circuit 13 through a transformer 14. The high-frequency circuit 2 is similar to the high-frequency circuit 1 in that it also contains an arc 25, a variable capacitance 11 and an inductance coil.

The antenna circuit 13 comprises an antenna 15 which is connected to a ground lead 16 through an inductance coil 17. The inductance coil 17 is shunted by a circuit which includes a rectifying device 18 and a second magnetizing winding 19. The permeability of the magnetic circuits through magnetizing windings 12 and 19 is adjusted to the desired value by means of a circuit which includes a source of energy 21, a manually-operable switch 22 and a third magnetizing winding 23.

The transformer 14 is provided with a restricted portion 24 whereby small changes in the currents traversing the magnetizing winding 19 causes relatively large changes in the reluctance of the magnetic circuit through the magnetizing windings 12, 19 and 23 by reason of the saturation of said restricted portion 24.

The high-frequency circuits 1 and 2 may be energized by any means well known to the art. In the drawings, the high-frequency currents are generated in circuits 1 and 2 by means of an arc 25 that is fed from a source of direct-current energy 26 through reactance coils 27. The periods of the high-frequency circuits 1 and 2 may be varied by adjusting either the variable capacitance 11 or the inductance of coils 6 and 8, respectively.

Referring to Fig. 2, the arrangement shown differs from that of Fig. 1 in the means for varying the relation between the high-frequency circuits 1 and 2. In this arrangement, a resistor 28 having such temperature coefficient that incoming signal impulses materially affect the resistance of said resistor 28 is included in the antenna circuit 13, and also is connected in shunt relation to the inductance coil 6 through a conductor 29 and a circuit including a variable capacitance 31. The high-frequency circuits 2 are energized in a manner similar to that shown in Fig. 1.

The arrangement shown in Fig. 3 differs from that of Fig. 2 in the utilization of a vacuum-tube device 33 for shunting an inductance coil 34 which is included in a high-frequency oscillating circuit 35. The vacuum-tube device 33 comprises an evacuated bulb 36 having a pair of hot electrodes 37 and 38 and a plate 39 located therein. The hot electrodes 37 and 38 are energized by any means (not shown) well known to the art. The plate 39 may be given a negative bias by means of a battery 40. The anode 39 and the hot cathode 37 are connected to opposite terminals of the inductance coil 17 and through conductors 41 and 42, respectively.

The hot cathodes 37 and 38 are connected to opposite terminals of the coil 34 through a conductor 43 and a conductor 44, which includes a variable condenser 45, respectively.

The high-frequency oscillating circuit 35 differs from circuit 2 in the utilization of the pair of inductance coils 34 and 6 in place of the inductance coil 8.

The antenna 15 is connected to the ground conductor 16 through a parallel resonant circuit which comprises the inductance coil 17 and a variable capacitance 46. The local receiving circuit 3 is similar to that of Figs. 1 and 2.

Upon a supply of energy to the arcs 25, high-frequency currents traverse the circuits 1 and 2. The periods of the currents, as hereinbefore stated, may be adjusted by varying either the variable capacitance 11 or the inductance of coils 6 and 8 which are included in the high-frequency circuits 1 and 2 respectively. Assuming the periods of the high-frequency circuits 1 and 2 to be substantially equal, or the period of the beat currents to be below that of an audible frequency, and assuming that the connections of the coils 7 and 9 are such that the currents in the local receiving circuit 3 are additive, a high-frequency current traverses the local receiving current 3 upon supplying energy to the arcs 25. By reason of the high-frequency of the currents traversing the local receiving circuit 3, or the low frequency of the beat-note, substantially no effect is observed in the receiving device 4.

Upon the receipt of wireless signals, the effect of the voltage drop across the inductance coil 17 is to cause currents to traverse the circuit including magnetizing winding 19 and the rectifier 18. The rectifier 18 causes the passage of a pulsating direct-current. It can thus be seen that, upon the receipt of an incoming wave, a change is effected in the magnetic saturation of the iron of the transformer 14, thus causing a change in the inductance of the coil 12 that is included in the oscillating circuit 1. This change in the inductance of the magnetizing winding 12 causes corresponding changes in the period of the high-frequency circuit 1. A change in the relative periods of the two high-frequency circuits 1 and 2 causes the formation of beat currents in the local receiving circuits 3. The period of the beat currents is dependent upon the change in the inductance of the coil 12 that is produced by the received impulses. The beat currents may be detected by any means well known to the art, such for example, as a rectifier 5 and a receiving device 4.

Referring to Fig. 2, the arrangement shown differs from that of Fig. 1 in the provision of a resistance element for effecting changes in the relation of the high-frequency circuits 2. Upon a small change in the resistance element 28, by reason of the receipt of a wireless wave, I have found that the relation between the high-frequency circuits 2 may be so changed as to result in the production of beat currents of substantially an audible frequency in the local receiving circuit 3.

Referring to Fig. 3, upon the energization of the high-frequency circuit 35, the electrons emitted by the cathodes 37 and 38 are attracted to the one or the other of the cathodes, depending upon which cathode is the more positive of the two. As the impedance of the circuit which includes the cathodes 37 and 38, condenser 45 coil 34 and conductors 43 and 44 is very high, only relatively small currents traverse said circuit.

I have found, however, that the impedance of the vacuum-tube device 33, and, therefore, the relation between the circuits 35 and 2, may be controlled by subjecting the electron stream to a varying electrostatic field, the value of which is proportional to the intensity of the received impulses.

In operation, the period of the parallel resonant circuit, which includes the variable capacitance 46 and the inductance 17, is adjusted to that of the incoming signal to cause maximum changes in the intensity of the electrostatic field. The variations in the electrostatic field that are caused by an incoming signal cause corresponding changes in the relation between the circuits 2 and 35 to cause the formation of beat currents in the receiving circuit 3.

In the foregoing description, the effect of an incoming signal has been to vary the relation between the two high-frequency circuits to cause the formation of beat currents in the local receiving circuit 3. It is obvious, to one skilled in the art, that the reverse procedure is equally applicable to my invention. That is, the beat currents may be caused to initially traverse the local receiving circuit 3, the effect of a received impulse being merely to cause the beat currents to periodically disappear or change in pitch.

The advantage of my arrangement is the provision of a simple, efficient and highly sensitive receiving system.

While I have shown three embodiments of my invention, it is capable of various other modifications in the means for varying the relation between the pair of high-frequency circuits without departing from the spirit of my invention.

I desire, therefore, that only such limitations shall be imposed thereon as are indicated in the appended claims.

I claim as my invention:

1. In a radio telegraphic receiving device, two circuits tuned to approximately the same frequency, means for maintaining oscillations in each of said circuits, means responsive to the difference of frequency between said circuits for producing signals and means responsive to the received signalling energy for altering the frequency of one of said circuits, said last named means comprising a magnetic core and a device including a rectifier for altering the average amount of flux in said core during the reception of signalling energy.

2. In a radio telegraphic receiving device, two circuits tuned to approximately the same frequency, means for maintaining oscillations in each of said circuits, means responsive to the difference of frequency between said circuits for producing signals and means responsive to the received signalling energy for altering the frequency of one of said circuits, said last named means comprising a rectifier and a winding in series, and a core common to said winding and to a part of said tuned circuits.

3. In a radio telegraphic receiving device, two circuits tuned to approximately the same frequency, means for maintaining oscillations in each of said circuits, means responsive to the difference of frequency between said circuits for producing signals and means responsive to the received signalling energy for altering the frequency of one of said circuits, said last named means comprising a magnetic core, adjustable flux producing means for maintaining said core at a sensitive magnetization, a winding on said core included in said tuned circuits, a second winding on said core and means including a rectifier for delivering signalling energy to said second winding.

4. In a radio telegraphic receiving device, two circuits tuned to approximately the same frequency, means for maintaining oscillations in each of said circuits, means responsive to the difference of frequency between said circuits for producing signals and means responsive to the received signalling energy for altering the frequency of one of said circuits, said last named means comprising a magnetic core forming an unbranched magnetic circuit, adjustable flux producing means for maintaining said core at a sensitive magnetization, a winding on said core included in said tuned circuits, a second winding on said core and means including a rectifier for delivering signalling energy to said second winding.

5. In a radio telegraphic receiving device, two circuits tuned to approximately the same frequency, means for maintaining oscillations in each of said circuits, means responsive to the difference of frequency between said circuits for producing signals and means responsive to the received signalling energy for altering the inductance in one of said circuits including a rectifier, a coil fed through said rectifier and a magnetic circuit common to said coil and a part of said circuit.

In testimony whereof, I have hereunto subscribed my name this 21st day of December, 1920.

CHESTER T. ALLCUTT.